United States Patent [19]

Ercilla

[11] Patent Number: 4,700,989
[45] Date of Patent: Oct. 20, 1987

[54] MOVABLE SEAT, PARTICULARLY A REMOVABLE VEHICLE SEAT

[75] Inventor: Jose A. Ercilla, Meru, France

[73] Assignee: Sable and Matra Automobile, Paris, France

[21] Appl. No.: 873,672

[22] Filed: May 7, 1986

Related U.S. Application Data

[63] Continuation of Ser. No. 663,177, Oct. 22, 1984, abandoned.

[30] Foreign Application Priority Data

Oct. 25, 1983 [FR] France ............................... 83 16958

[51] Int. Cl.⁴ .............................................. B60N 1/02
[52] U.S. Cl. .................................... 297/331; 248/501; 296/65 R; 297/379
[58] Field of Search ................. 297/14, 334, 331, 379; 248/501; 296/65 R

[56] References Cited

U.S. PATENT DOCUMENTS

| | | | |
|---|---|---|---|
| 3,328,077 | 6/1967 | Krasinski | 297/379 |
| 3,398,987 | 8/1968 | Lynn et al. | 297/379 |
| 3,880,464 | 4/1975 | Murphy et al. | 297/331 X |
| 3,915,493 | 10/1975 | Brown | 248/501 X |
| 4,169,626 | 10/1979 | Hollar, Jr. | 297/379 X |
| 4,268,086 | 5/1981 | Okuyama | 297/379 X |
| 4,316,633 | 2/1982 | Zaccariotto | 297/379 X |
| 4,318,569 | 3/1982 | Bilenchi et al. | 297/379 |
| 4,372,610 | 2/1983 | Fisher, III et al. | 297/379 X |
| 4,484,776 | 11/1984 | Gokimoto et al. | 297/379 X |
| 4,484,779 | 11/1984 | Suzuki | 297/331 X |

FOREIGN PATENT DOCUMENTS

| | | | |
|---|---|---|---|
| 22691 | 1/1981 | European Pat. Off. | 297/379 |
| 1131530 | 6/1962 | Fed. Rep. of Germany | 296/65 R |
| 2449552 | 10/1980 | France | 297/379 |
| 4249 | 1/1980 | Japan | 297/331 |
| 164532 | 12/1980 | Japan | 297/331 |
| 85730 | 5/1983 | Japan | 297/334 |
| A2041064 | 9/1980 | United Kingdom | 297/379 |
| A2065761 | 7/1981 | United Kingdom | 297/331 |

Primary Examiner—Kenneth J. Dorner
Assistant Examiner—Thomas A. Rendos
Attorney, Agent, or Firm—Murray and Whisenhunt

[57] ABSTRACT

A movable seat assembly, such as a removable vehicle seat, comprising a structure having front legs and rear legs, each of the legs including a fork member and arranged to co-operate with a fixed attachment rod of a frame. A movable lock member is provided on each leg and is used to lock the leg on the corresponding attachment rod. A return biasing means is provided for urging each of the lock members into its locked position, and manually operated means are provided for actuating each of the lock members into its unlocked position, against the return biasing means, in order to release the seat legs from the corresponding attachment rods.

16 Claims, 3 Drawing Figures

MOVABLE SEAT, PARTICULARLY A REMOVABLE VEHICLE SEAT

This application is a continuation of Ser. No. 663,177, filed Oct. 22, 1984, now abandoned.

This invention concerns movable seats, particularly seats for vehicles.

A first object of the invention is to provide a seat which, while being normally fastened onto its supporting frame, can easily be removed without using any tool such as a wrench or a screwdriver, the removal of the seat being performed by a simple manual unlocking operation.

Another object of the invention is to provide a seat which, while being removable as indicated above, can be swing forward, while remaining mounted on its supporting frame, in order to generate a space corresponding to the volume occupied by the seat in its normal position, that space being adapted for instance to let a passenger have access to a door or from a door, or being adapted to provide a loading or unloading space.

Still another object of the invention is to provide a seat which can be mounted in a vehicle, facing either the front or the rear, with respect to the driving direction of the vehicle.

The seat according to the invention comprises: a supporting frame having front legs and rear legs, each leg system being in the form of a fork, and arranged for cooperation with a fixed rod of the frame; a movable lock member provided on each leg, for fastening the leg on the corresponding fixed rod; return biasing means, for urging the lock member towards its locking position; and manually operated means for actuating the lock member towards its unlocking position, against the return biasing means, in order to disengage the legs with respect to the attachment rods.

With such an arrangement, the seat structure is normally maintained on the attachment rods, in a firm manner, by the legs, the latter being locked in their normal position by the lock member. However the seat structure, and therefore the seat itself, can be easily removed by manual operation of the lock member, that is without having to use any tool, such as a wrench or a screwdriver.

According to another aspect of the invention, the actuation means of the rear lock members can be operated for any seat position, whereas the actuation means of the front lock members can be operated only when the seat is in its forward swung position. This particular feature of the seat according to the invention thus prevents any unlocking of the front legs as long as a passenger is seated on the seat.

According to a preferred embodiment, the seat structure is provided with a control rod system, which moves with respect to the seat structure and with respect to the frame which supports the seat structure, when the seat is being swung. The control rod system comprises a stop member for locking the manually operated actuating means of the front lock members when the seat is not in its upright position, and for releasing the actuating means when the seat is in its upright position.

In a particular embodiment, the front legs are fixed with respect to the seat structure, whereas the rear legs each comprise a lever hinged on the seat structure and so arranged as to retract along the structure when the seat is in its upright position. The lever advantageously cooperates with the above defined control rod system, for locking the manually operated actuating means of the front lock portions. To that effect, a connecting rod is provided, with its rear end hinged to the lever, and its front end hinged to an intermediate bracket. The intermediate bracket is itself hinged on the seat structure, in the vicinity of the front legs, and freely glides against the upper face of the frame which supports the seat. Various hinge points of the connecting rod and the intermediate bracket are so arranged that, when the seat is swung to the front, the rear legs rotate to the front, while retracting into the seat structure.

According to still another particular feature of the invention, the seat structure comprises a back structure portion with a hinged arrangement which permits the back portion of the seat to be moved to a folded position substantially parallel to the seating portion of the seat.

The invention will be understood through the following description, with reference to the appended drawings, in which:

FIG. 3 is a partly cut-away side view of a seat according to the invention facing in the opposite direction of that shown in FIG. 1.

Figure 1:
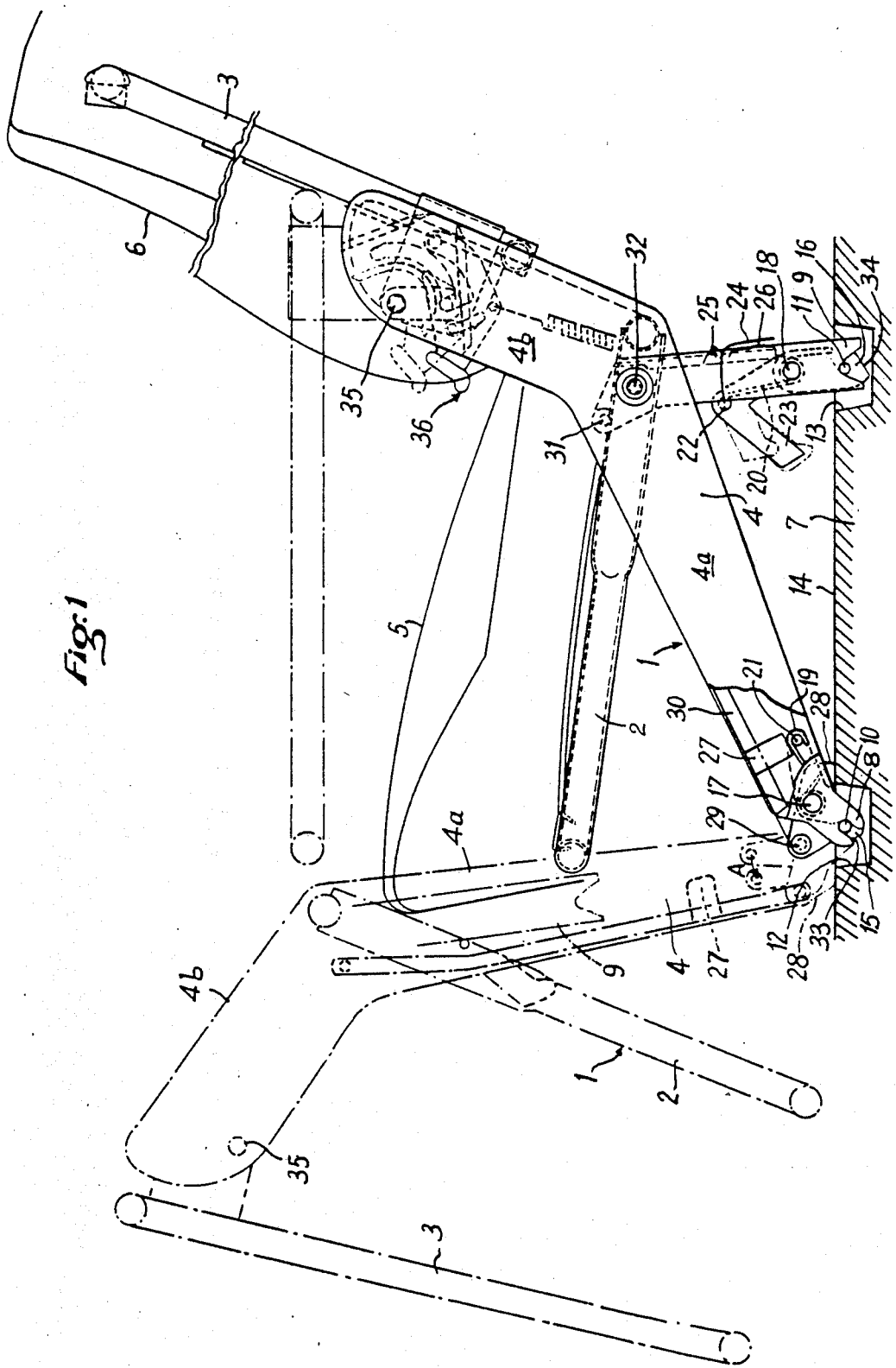
FIG. 1 is a partly cut-away side view ot a seat according to the invention.

FIG. 1 shows a seat, for instance for a vehicle, comprising a structure 1 for instance of metal, made of a seat portion structure 2, a back portion structure 3, and a leg portion structure 4. The seat portion structure 2 supports a seat portion upholstery 5, while the back portion structure supports a back portion upholstery 6.

The leg portion 4 is used as a support of the seat on the fixed frame 7, such as the vehicle frame in the preferred embodiment. The leg portion 4 comprises two front legs 8 and two rear legs 9. Each leg 8,9, is in the form of a fork which is adapted to engage a seat support means including an attachment rod 10,11, of the frame 7. Preferably, the attachment rods 10, 11, are so arranged in cavities 12,13, of frame 7 so that, when the seat is removed as hereinafter described, the seat support means do not project above the upper surface 14 of frame 7.

On each side of the seat, the seat portion 4 comprises an elongated lever in the form of an elbow, with a front arm 4a forwardly and downwardly inclined, and a rear arm 4b rear wardly and upwardly inclined, substantially in the direction of the back portion structure 3 in the normal position of the seat on its attachment rods 10,11. The front leg 8 forms the front end of arm 4a, while the rear leg 9 is formed by a lever which projects downwards from the junction between arms 4a and 4b, this junction area also bearing the seat portion structure 2.

The forks 8,9, of the seat legs free rest on the attachment rods 10, 11. In that position, the opening of each fork is substantially directed downwards.

Each leg 8,9, bears a lock member 15, 16 which normally cooperates with the corresponding attachment rod 10, 11 to retain the seat assembly on the rod.

To that effect each lock member 15, 16 comprises an end in form of a hook adapted to cooperate with the lower surface of the attachment rods 10, 11. Each lock member is hinged on the corresponding leg about a hinge point 17, 18 having a transverse axis. A torsion spring 19, 20, urges the corresponding lock member towards its locked position.

Both front lock members are connected through a transverse rod 21, while the rear lock members are connected through a transverse rod 22. The front lock members can be manually operated, through direct manual actuation of rod 21; the rear lock members can be operated through manual actuation of a handle 23 arranged on the side of the seat and integral with lock member 16; such a handle 23 can be provided on one side only or on both sides of the seat.

Handle 23 is used to lock members 16, when the user is at a side of the seat, for instance when getting into the vehicle. When the user is behind the seat, and wishes to bring the seat in its upright position, thereby swinging the seat to the front, the handle 23 can be difficult to reach. Therefore, the user being behind the seat can actuate the connecting rod 22, using a strap 24 which is attached to the rod, through a hole 25 of a cross beam 26 linking the rear legs 9.

Rear lock members 16 can be thus freely operated, by actuation of handle 23 or connecting rod 22, in any angular seat position. On the contrary, the front lock members 15 can be operated only if the seat is in its upright position, as shown in phantom lines in FIG. 1. Therefore a movable stop member 27 is provided, with two possible positions with respect to connecting rod 21 of the front lock members. In a first or locked position, the stop member is close to rod 21, when the seat is in its normal lowered position, as shown in solid lines in FIG. 1. The stop member 27 sets free the rod 21, to allow a swinging motion of lock members 15 around their hinges 17 in the unlocking direction, when the seat has been brought to its swung position to the front. During this uplifting motion of the seat, rod 21 and frame 4 have no relative displacement. Therefore, to disengage stop member 27 from rod 21 during this uplifting motion, it is necessary to make the stop member 27 freely movable with respect to frame 4, during this motion. To that effect, stop member 27 is associated with a system which co-operates with the upper surface 14 of frame 7.

In the embodiment shown in FIG. 1, a pad member 28 is provided which is hinged on one of the front legs 8 around hinge axis 17 and adapted to have its face resting on the upper surface 14 of frame 7. On pad member 28 is hinged a bar 30, at hinge point 29, with bar 30 bearing the fixed stop member 27, and being obliged to remain substantially parallel to arm 4a of the seat portion structure 4, as hereinafter explained.

In the lowered position of the seat, as shown in FIG. 1, the hinge 29 of bar 30 is located above and forward of rod 10, the hinge 17 is located above and behind rod 10 and lower than hinge 29, and rod 21 is located behind hinge 17, substantially at the same height-level as hinge 29. In this position of the seat assembly, stop member 27 is located immediately above rod 21. In the uptilted position of the seat, hinge 17 and rod 21 occupy positions which are derived from their former positions through a rotation around the axis of attachment rod 10, whereas hinge 29, with respect to its former position, occupies an advanced position at the same height-level. Consequently, when the seat is swung to the front, stop member 27, with respect to its former position, will occupy a position nearer to arm 4b, thus releasing connecting rod 21. As shown with arrow A, this latter rod 21 can be swung to the front, to disengage lock members 15 from the front attachment rods 10.

According to another feature of the invention, the rear legs 9 can be retracted between the two arms 4a of the leg assembly 4, in the uptilted position of the seat. Therefore the upper end of leg 9, opposite to that forming the fork portion, is hinged on the rear end of bar 30 at hinge point 31. Legs 9 are hinged on the leg assembly 4 in the junction area of arms 4a, 4b around a transverse hinge axis 32, near hinge point 31. During the uplifting motion of the seat, while the latter is swung around the front attachment rods 10, bar 30 becomes actuated by pad member 28, thus retracting into arm 4a, and urging legs 9 to rotate clockwise (FIG. 1) and to retract along leg assembly 4 between arms 4a. Thus, as shown with phantom lines in FIG. 1, the seat assembly has no part of it projecting rearwards, when in its uplifted position.

In order to have lock members 15, 16 engaged automatically on their respective attachment rods 10, 11, each of the lock members, on its outside face opposed to the hook recess, is provided with a slanted engagement ram 33, 34. Each ramp 33, 34 has such a direction, with respect to the corresponding hinge 17, 18, that each lock member will readily trip towards its unlocked position, against its return spring 19,20, when the lock members apply a pressure on the attachment rods 10, 11, through their ramps 33, 34.

When lock members 15, 16 are not co-operating with the attachment rods 10, 11, the end of their travel is defined by their stopping against arm 4a of the leg assembly and leg 9, respectively.

According to still another feature of the invention, the assembly comprising the back portion structure 3 and the back portion upholstery 6, can be folded to the front and downwards with respect to the rest of the seat. Therefore the back portion structure 3 is hinged onto the upper end of arm 4b of the leg assembly around a transverse axis 35. Manually operated locking means 36 are provided in order to maintain the back portion assembly 3,5, either in its unfolded position, as shown with solid lines in FIG. 1, or in its substantially horizontal folded down position, as shown with phantom lines in FIG. 1.

The seat according to the invention is used as hereinafter explained.

Normally the seat is in the position which is shown with solid lines in FIG. 1. In this position, legs 8,9, are locked onto attachment rods 10,11 by their locking members 15, 16. The latter are held in locked position by their springs 19,20, while the front lock members 15 are maintained by stop member 27 which prevents the lock members from tripping over in their unlocking direction. To swing the seat assembly to the front, the user only has to operate handle 23 or strap 24, thus releasing the rear lock members 16, against their springs, and allowing the rear legs 9 to be separated from the rear attachment rods 11. The seat assembly can then be freely swung to the front. During this swinging motion, the rear legs 9 retract into the leg assembly 4. When the seat is in this uplifted position, connecting rod 21 of the front lock members 15 can be reached from the rear, and thus made free from stop member 27. Consequently, the user can actuate lock members 15, as he wishes, against their springs in the unlocking direction in order to release the front legs 8 from the front attachment rods 10. While lifting the seat assembly, the user thus can disengage it from the attachment rods 10, in order to remove it completely.

It should be pointed out that this removal operation of the seat assembly can be performed by the user without the need of any tool, such as a wrench or a screwdriver, and without having to disassemble any removable part, all components of the seat assembly actually remaining on the assembly.

Since attachment rods 10, 11, are located below the level of the upper surface 14 of frame 7 there is no projecting part with respect to said surface for the mounting means of the seat assembly. A flush floor is thus provided after the seat removal.

Another important advantage is provided by the fact that the front legs 8 can co-operate with the rear attachment rods 11, whereas the rear legs 9 can inversely co-operate with the front attachment rods 10. In other words, the seat assembly of the invention can be mounted either facing to the front, with respect to the driving direction of the vehicle, or facing in the opposite direction.

Still another advantage of the seat of the invention lies in the fact that the uptilting of the seat assembly and/or the removal of the latter can be performed in any position of the back portion 3,6, with respect to the rest of the seat assembly.

When one wishes to put the seat assembly back to its place, the front legs 8 should first be engaged on the connecting rods 10, the seat assembly then being in its uptilted position, as shown in phantom lines, to keep rod 21 free from stop member 27. Owing to their ramps 33, the front lock members 15 will rotate towards their unlocked position against their springs 19 to allow rods 10 into the forks, the lock members returning back afterwards into their locked position under action of their springs 19. Then, similarly, the rear legs 9 should be engaged over the rear attachment rods 11, while the rear lock members 16 first trip towards their unlocked position, owing to their ramps 34, and then fall back again into their locking position, behind attachment rods 11, under action of their return springs 20.

Figure 2:
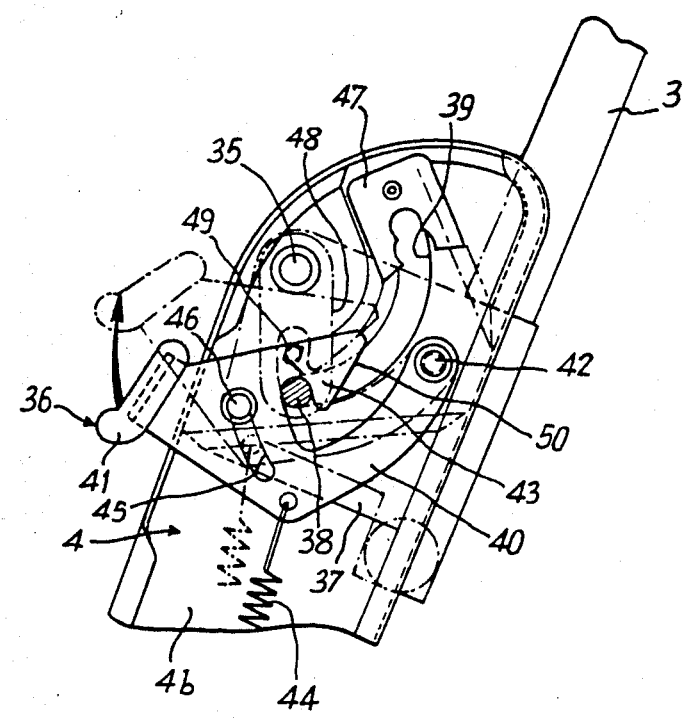
FIG. 2 is a vertical section of a part of the seat of FIG. 1.

FIG. 2 shows in detail mounting means of the back portion structure 3 onto the upper arm 4b of leg assembly 4, as seen from the inside of the seat assembly.

The lower end of back portion structure 3 bears a fixed plate 37, which is supported by arm 4b through the transverse hinge 35. Plate 37 bears a transverse finger 38 which can travel in an arcuate groove 39 of arm 4b centered on the axis of hinge 35, for the tilting motion of the seat assembly.

A lock member 40 has an actuating handle 41 attached to one end, while its other end is hinged onto structure member 4b at hinge point 42, the central part of lock member 40 being in the form of a hook 43 adapted to receive finger 38 and to prevent said finger from moving in groove 39. Lock member 40 is urged to a lower position by a traction spring 44 attached to arm 4b. It is provided with an arcuate groove 45 centered on the axis of hinge 42 and receiving a finger 46 borne by plate 4b to define the limits of travel of the lock member. The lock member 40 is moveable between a lower position where hook 43 blocks groove 39, thus locking there finger 38, and an upper position where hook 43 releases finger 38, for a free folding down of the back portion. A stop member 47, for instance of plastic material, is provided at the end of groove 39, to define the folded down position of the back portion. Preferably the stop member 47 can have its position adjusted in order to vary the angular folded-down position of the back portion, for instance when using the back portion as an auxiliary shelf.

Preferably the angular position of the back portion also can be adjusted in the upright position of the latter. To that effect, the finger 38 is not directly mounted on plate 37, but is mounted to a lever 48, which is attached to plate 37 through hinge 35, and can be locked up in a chosen angular position on plate 37, by a screw 49. The travel limit of the back portion 3 towards its "seating position" is defined by the travel limit of finger 38 in hook 43.

Hook 43 is provided with an engagement ramp 50 at the same level as groove 39, for automatically releasing lock member 40 when the back portion is moved back towards its upright position.

Lock member 40 is shown in FIG. 2, with solid lines in its locked position, and with phantom lines in its unlocked position.

Preferably an assembly 36 as that in FIG. 2 is provided on each side of the seat, both lock members 40 being then coupled through a transverse rod, and an actuating handle 41 being provided on one lock member only or alternatively on each lock member.

Advantageously, each hinge point 31 can be arranged to receive an end of a safety belt.

I claim:

1. A movable seat assembly suitable for use as a removable vehicle seat, said seat assembly comprising:
    seat structure having front seat legs and rear seat legs, each of said legs including a fork member cooperable with a fixed attachment rod of a frame supporting the seat assembly, said frame having an upper surface;
    a movable lock member on each said front seat leg and rear seat leg for locking said leg on the corresponding attachment rod;
    return biasing means for urging each of said lock members into a locked position on the corresponding attachment rod;
    manually operated means for actuating each of said lock members into an unlocked position, against said return biasing means in order to release the seat legs with respect to the corresponding attachment rod, said seat assembly being movable between a lowered position and an uptilted position, said manually operated means of the rear lock members being operable in any position of the seat assembly, said manually operated means of the front lock members being operable only when the seat assembly is in its said uptilted position, in order to prevent unlocking of said front seat legs when a passenger is seated on the seat assembly;
    a control rod system movable with respect to said seat structure and said frame during motion of the seat assembly between said lowered and uptilted positions, said control rod system comprising a stop member for locking said manually operated means of the front lock members when the seat assembly is not in its uptilted position, and for releasing said manually operated means of the front lock members when the assembly in its uptilted position.

2. A seat assembly according to claim 1, and further including a pad member hinged onto the front leg and a bar bearing said stop member, said pad member having a front surface in sliding contact with said upper surface of said frame, to move said bar with respect to said manually operated means of the front lock members, thereby releasing said stop member from said manually operated means as said assembly moves to its uptilted position.

3. A seat assembly according to claim 2, wherein said front legs are fixed with respect to said seat structure, while said rear legs each comprise a hinged lever arranged on said seat structure for retracting along said structure when said seat assembly is brought into its uptilted position.

4. A seat assembly according to claim 3, wherein said hinged lever forming the rear leg is hinged onto said bar.

5. A seat assembly according to claim 1, wherein said front lock members are connected through a transverse control rod, said transverse control rod being reachable from underneath said seat structure.

6. A seat assembly according to claim 1, wherein said rear lock members are connected through a transverse control rod, and at least one of the rear legs bearing a handle for manual control of said rear lock members, said handle being reachable laterally of said rear lock members.

7. A seat assembly according to claim 6, wherein a strap is hooked onto said transverse control rod and extends rearwardly of the seat assembly, for controlling the rear lock members rearwardly of the seat.

8. A seat assembly according to claim 1, wherein said front lock members and rear lock members include engagement ramps for automatically retracting said lock members against their return biasing means when the seat assembly is brought into position on its attachment rods.

9. A seat assembly according to claim 1, wherein said seat comprises no removable part when moved to its uptilted position or when it is disengaged from said attachment rods.

10. A seat assembly according to claim 1, wherein said attachment rods are arranged within cavities provided below the level of said upper surface of said frame, thereby ensuring a flush upper surface on said frame when the seat assembly is removed.

11. A seat assembly according to claim 1, wherein the front legs are connectable with the rear leg attachment rods and the rear legs are connectable with the front leg attachment rods, for mounting the seat assembly either facing forward or rearward in relation to the front of the vehicle.

12. A seat assembly according to claim 1, and further including a back portion structure hingedly mounted on said seat structure, said back portion structure including a lock member for maintaining said back portion structure in an appropriate resting position for a passenger, said back portion lock member bearing a control handle for releasing said back portion lock member, said handle operating against a return spring which normally urges said handle into a locked position.

13. A seat assembly according to claim 12, wherein said back portion lock member defines an upright position of said back portion structure and cooperates with a finger which is movable together with said back portion structure, said finger being provided with adjustment means for adjusting the position of said finger on said back portion structure, thereby adjusting said upright position of said back portion structure.

14. A seat assembly according to claim 13, wherein adjustable stop means are provided for defining a travel limit of said back portion structure when said back portion structure is folded down.

15. A seat assembly according to claim 14, wherein said adjustable stop means comprise an adjustable stop member cooperable with said finger at said travel limit when said back portion structure is folded down.

16. A seat assembly according to claim 15, wherein said adjustable stop member is fabricated from plastics material.

* * * * *